Dec. 30, 1958     J. KOVACS     2,866,343
SPEED LIMITING DEVICE
Filed May 17, 1955     2 Sheets-Sheet 1
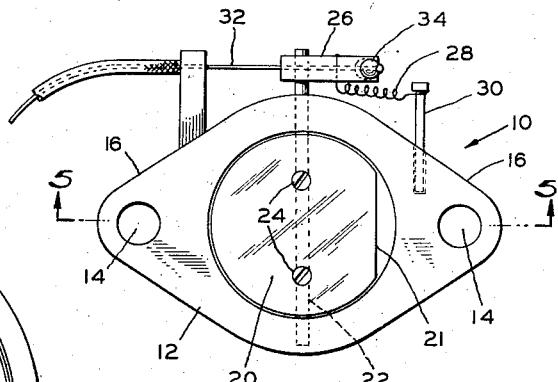
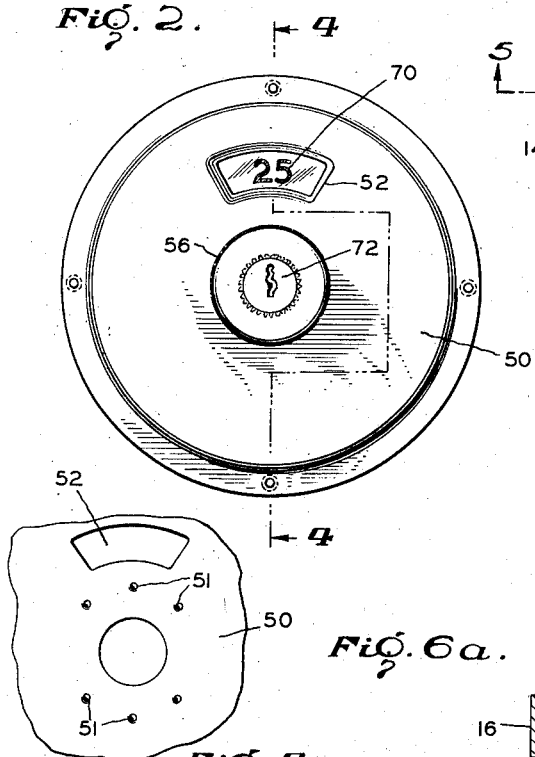
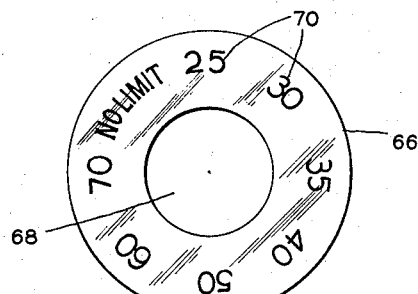
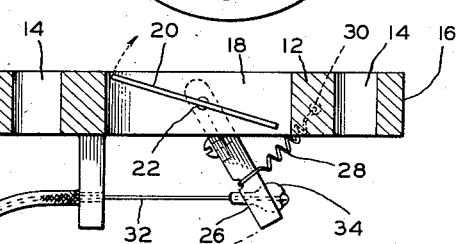
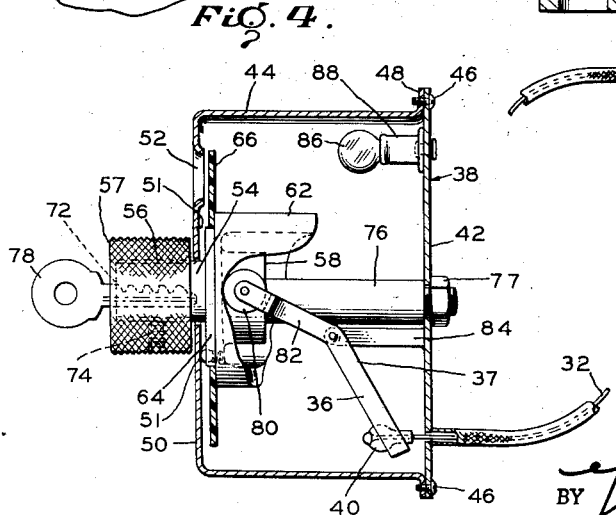
INVENTOR
Joseph Kovacs.
BY *Gustave Miller*
ATTORNEY Dec. 30, 1958 J. KOVACS 2,866,343
SPEED LIMITING DEVICE
Filed May 17, 1955 2 Sheets-Sheet 2
Fig. 6.
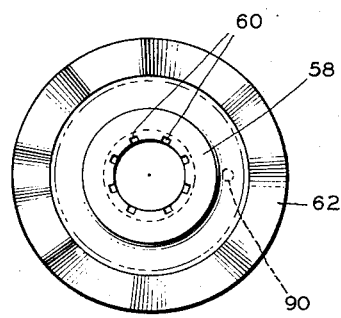
Fig. 9.
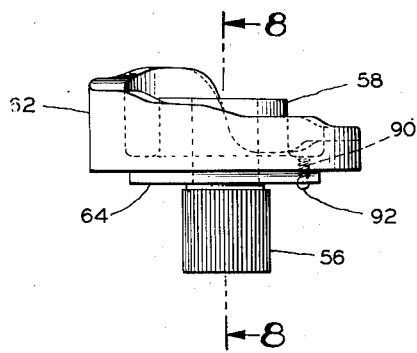
Fig. 7.
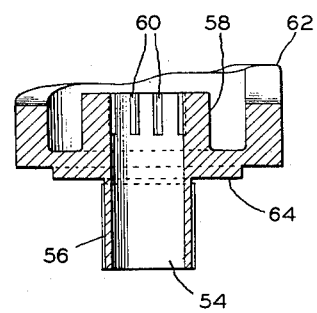
Fig. 8.
INVENTOR
Joseph Kovacs.
BY Gustave Miller
ATTORNEY United States Patent Office 2,866,343
Patented Dec. 30, 1958

2,866,343
SPEED LIMITING DEVICE
Joseph Kovacs, Waukegan, Ill.
Application May 17, 1955, Serial No. 508,846
1 Claim. (Cl. 74—54)

This invention relates to a motor vehicle speed limiting device, and it particularly relates to a speed limiting device which can be manually adjusted and then locked in adjusted position.

The present speed limiting device has many advantages among which is the fact that it makes it possible for the driver to set the maximum speed of the vehicle to the speed limit of the particular State or area through which he is driving; thereby enabling him to give his full attention to the road, without the necessity of constantly watching his speed indicator to see whether he is exceeding the speed limit.

Another advantage of the present device is the fact that it prevents unconscious speeding on the highway due to driving fatigue; this is because, when driving over relatively long distances, the driver, as he becomes tired, tends to permit his foot to relax and, thereby, rest more heavily on the accelerator. By using the present speed limiting device, the speed of the vehicle cannot increase beyond the set predetermined limit set by the speed limiting device, no matter how heavily his foot rests on the accelerator.

The present speed limiting device is particularly important when there are teen-age drivers in the family. The setting and locking of the speed limiting device prevents any tendency to recklessness on the part of the young driver.

The present speed limiting device is also useful for trucking or bus companies to limit the speed of the vehicles to safe maximum speeds as determined by the companies.

The present speed limiting device is also possessed of the great advantage of being relatively small, cheap and easy to install in any make or type of motor vehicle.

It is, therefore, one object of the present invention to provide a speed limiting device which may be set manually to any maximum speed and which may then be locked in such position.

Another object of the present invention is to provide a speed limiting device which is compact, easy to handle, and which can be easily installed.

Other objects of the present invention are to provide an improved speed limiting device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a top plan view of the valve section of a device embodying the present invention.

Fig. 2 is a front elevational view of the control housing.

Fig. 3 is a front elevational view of the indicator disc of the control mechanism.

Fig. 4 is a side view, partly in section and partly in elevation, taken on line 4—4 of Fig. 2.

Fig. 5 is a cross-sectional view of the valve device taken on line 5—5 of Fig. 1.

Fig. 6 is an end elevational view of the cam.

Fig. 6a is a fragmentary elevational view of the inside surface of the housing front face.

Fig. 7 is a detailed side elevational view of the cam and its knob control.

Fig. 8 is a cross-sectional view taken on line 8—8 of Fig. 7.

Fig. 9 is a diagrammatic view of the cam curve.

Referring now in greater detail to the drawings wherein similar reference characters refer to similar parts, there is shown a valve device, generally designated 10, which is adapted to fit between the carburetor and the intake manifold of the automobile engine. The valve device 10 comprises a plate 12 having bolt openings 14 in side flanges 16; these side flanges 16 connecting the plate 12 in place by means of appropriate bolts or the like extending through the openings 14. A central opening 18 is provided in the plate 12 and in this central opening is pivotally supported a damper type disc valve 20. This disc valve is of substantially the same diameter as the opening 18 except that one segment thereof is cut away as at 21. The valve 20 is mounted on a stem 22, as by screws 24. The stem 22 is journaled in the side portions of the plate 12 and, at one end, extends outwardly of the plate to support a lever 26. This lever 26 is spring-biased by a spring 28, connected between the lever and a pin 30, so as to urge the damper toward closed position against the opening 18. A flexible Bowden cable 32 is attached to the lever 26 by a ball point 34, and connects the lever to a lever arm 36 of a lever 37 which is situated in a control housing 38; this connection being by means of a ball joint 40.

The control housing 38 is preferably mounted on the instrument panel of the vehicle and comprises a back plate 42 to which is connected a cup-shaped frame 44; this connection being effected by bolts 46 connecting a lateral flange 48 on the cup-shaped frame to the back plate 42. In this manner, the housing can be opened by removing the back plate so that any necessary repairs or adjustments can be made on the mechanism within the housing.

The front face 50 of the housing 38 is provided with a slot 52 at its upper portion, as well as with a central aperture. Through this central aperture extends a tubular stem 54, the external portion 56 which is knurled to provide key ways for a manually actuated knurled hand knob 57 which is secured on the external portion 56 of the stem 54 by a set screw 74. The internal portion within the housing 38 is provided with a hub portion 58 having a series of peripherally spaced slots 60 in the annular wall thereof. Integral with the hub portion 58, and spaced radially outward thereof, is a cam plate 62. The cam plate 62 is curved in the manner diagrammatically indicated in Fig. 9.

An annular flange 64 extends forwardly of the hub portion 58 and has a diameter larger than that of the hub portion but smaller than the cam plate 62. This flange 64 fits within the housing 38 and supports a centrally apertured dial 66, the flange frictionally engaging within the central aperture 68 of the dial. The dial 66 is provided with suitable indicia 70 on its front face to indicate the speed limit setting, this setting being shown in the window slot 52 of the housing as the dial 66 rotates with the hub portion 58 and cam plate 62 upon rotation of the knob 57.

A lock means 72 is fitted in the bore of the tubular stem 54 and is adapted to be held in fixed position. An extension 76 of this lock means extends through the hub portion and through the housing to provide a shaft for supporting the cam plate 62 for rotation thereon. This extension is provided with a screw-threaded, reduced end which is connected to the back plate 42 of housing 38 by a nut 77. The lock means is provided with a lock pin, not shown, which is adapted to be received in any one of the slots 60. This lock pin is locked into one of the slots 60 by a key mechanism operated by a key 78. There is one slot 60 provided for each number on the dial face.

A cam follower roller 80 coacts with the cam plate 62, this cam follower being mounted on a lever arm 82 of the lever 37, and integral with arm 36, but offset therefrom. The lever 37 is pivotally mounted, at the juncture point of its two arms, on the end of a support bar 84 extending inwardly from the back plate 42 of the housing 38.

A light bulb 86 is fitted in a connection 88 which is electrically connected to a source of electrical energy by suitable wiring, not shown. This light bulb provides illumination for the interior of the housing so that the dial numbers can be easily seen in the slot window 52.

A recess 90 is provided in the cam plate 62 and extends through flange 64. A spring-pressed ball 92 is provided in this recess. On the back of front face 50 there is provided a circular series of small indentations 51. These indentations 51, the slots 60 of hub 58, and recess 90 in flange 64 are all spaced the same radial distance from the common center of face 50, flange 64 and hub 58. The spring-pressed ball bears against a selected one of the indentations 51 and acts to resiliently yet releasably secure the flange 64 to the front plate 50.

In operation, to set the desired speed limit, if the lock is in locked position, it must be unlocked with the key 78 so that the lock pin is withdrawn from the slot in which it rests. The knob 57 can then be rotated in the desired direction until the desired maximum speed number appears in the slot 52; this being effected by the rotation of the dial 66 in conjunction with cam plate 62. When the desired setting is reached it is maintained by the bias of the ball 92 in the indentations 51. The key 78 may be operated to lock the lock pin in the slot 60 coresponding to the desired speed indicated on the dial face if it is desired to lock the maximum setting against change, as by a parent against a teen-ager.

The higher portion of the cam plate corresponds to the higher maximum speeds while the lower portion corresponds to the lower speeds.

When the cam is adjusted so that the follower contacts the higher portion, wherein the dial is set at "no limit," the lever arm 37 is rocked to the position where it pulls the flexible cable 32 inwardly, thereby acting, through lever 26, to pivot the damper valve 20 into open position, against the biasing force of the spring 28. This permits a greater amount of the air and gas mixture to enter the manifold. When set to low speed limit, the cam follower rests on the lowest portion of the cam. This rocks the lever arm 36 outwardly to ease the tension on cable 32 and to, thereby, permit the spring-pressed lever 26 to close the damper valve. This closing movement is caused not only by the biasing action of the spring 28 but also by the negative pressure behind the damper. The cut-away portion 21 of the damper valve forms a sufficient opening, even when the valve is closed, to permit enough of the air-gas mixture to enter the manifold to enable the motor to idle, and to provide a minimum speed limit of, for example, about 25 miles per hour.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

An indicator control means comprising a housing, a cam barrel within said housing and extending from one wall thereof, a cam face on the free end of said barrel, a cam follower in said housing, means for resiliently urging said cam face and said cam follower toward one another, a dial having indicating indicia thereon rotatable in said housing with said cam barrel, the cam surfaces of said barrel being coordinated with said indicia, a window in said housing through which a portion of said dial can be viewed, means outside said housing for rotatably adjusting said cam barrel to a selected position whereby said cam follower is actuated to a position determined by the particular area of the cam on which said follower rests, and means to maintain said cam barrel in said selected position.

References Cited in the file of this patent
UNITED STATES PATENTS

| | | |
|---|---|---|
| 965,322 | Peterson | July 26, 1910 |
| 1,350,741 | Schwartz | Aug. 24, 1920 |
| 1,388,280 | Mason | Aug. 23, 1921 |
| 1,634,437 | Schmid | July 5, 1927 |
| 1,884,804 | Millington | Oct. 25, 1932 |
| 1,947,036 | Cullinan | Feb. 13, 1934 |
| 2,056,549 | Weinberg | Oct. 6, 1936 |
| 2,155,254 | Clark | Apr. 18, 1939 |
| 2,463,446 | Wallace | Mar. 1, 1949 |
| 2,768,604 | Enerud | Oct. 30, 1956 |

FOREIGN PATENTS

| | | |
|---|---|---|
| 207,926 | Great Britain | of 1923 |
| 606,522 | France | of 1926 |